(12) United States Patent
Groebel

(10) Patent No.: US 8,562,478 B2
(45) Date of Patent: Oct. 22, 2013

(54) DIFFERENTIAL FOR MOTOR VEHICLES

(75) Inventor: Christoph Groebel, Remscheid (DE)

(73) Assignee: Sona BLW Prazisionsschmiede GmbH, Remscheid (DE)

( * ) Notice: Subject to any disclaimer, the term of this patent is extended or adjusted under 35 U.S.C. 154(b) by 0 days.

(21) Appl. No.: 13/820,254

(22) PCT Filed: Jul. 29, 2011

(86) PCT No.: PCT/EP2011/003811
§ 371 (c)(1),
(2), (4) Date: Mar. 1, 2013

(87) PCT Pub. No.: WO2012/034618
PCT Pub. Date: Mar. 22, 2012

(65) Prior Publication Data
US 2013/0165290 A1     Jun. 27, 2013

(30) Foreign Application Priority Data

Sep. 15, 2010  (DE) .................... 10 2010 045 451
Dec. 15, 2010  (DE) .................... 10 2010 054 655

(51) Int. Cl.
*F16H 48/06* (2006.01)

(52) U.S. Cl.
USPC ............. 475/220; 475/230; 74/606 R; 74/640

(58) Field of Classification Search
USPC .................... 475/220, 230; 74/606 R, 640
See application file for complete search history.

(56) References Cited

U.S. PATENT DOCUMENTS

| | | | |
|---|---|---|---|
| 2,364,411 A * | 12/1944 | White ......................... | 475/230 |
| 3,554,055 A | 1/1971 | Galaniuk | |
| 3,872,741 A * | 3/1975 | Berchtold et al. ............ | 475/246 |
| 4,221,138 A * | 9/1980 | Stewart et al. ................. | 74/607 |
| 4,455,889 A | 6/1984 | Hauser | |
| 7,217,217 B2 * | 5/2007 | Santelli ......................... | 475/230 |
| 2005/0032601 A1 | 2/2005 | Kashiwazaki | |
| 2010/0184552 A1* | 7/2010 | Soybel et al. ................. | 475/230 |
| 2010/0323841 A1* | 12/2010 | Engelmann ................... | 475/220 |
| 2011/0183804 A1* | 7/2011 | Fabian .......................... | 475/220 |
| 2011/0230300 A1* | 9/2011 | Six ................................ | 475/220 |

FOREIGN PATENT DOCUMENTS

| | | |
|---|---|---|
| DE | 1810520 | 6/1970 |
| DE | 4417373 | 11/1995 |
| DE | 10014875 | 9/2001 |
| EP | 0356276 | 2/1990 |
| WO | 2008040375 | 4/2008 |

OTHER PUBLICATIONS

International Search Report dated Sep. 9, 2011 from the corresponding PCT/EP2011/003811.

* cited by examiner

*Primary Examiner* — Justin Holmes
(74) *Attorney, Agent, or Firm* — Katten Muchin Rosenman LLP

(57) ABSTRACT

In a differential for motor vehicles, comprising a tubular differential housing (5), in which differential bevel gears (4) are supported on a housing-mounted carrier stud (11) and are meshed with halfshaft bevel gears (8), and wherein the differential housing (5) has two diametral halfshaft holes (9) for feeding the axle drive shafts through and two diametral stud holes (10) for accommodating the carrier stud (11), recesses (18) are provided at both ends of the differential housing (5). Said recesses describe cutouts of the differential housing (5) that approach the halfshaft holes (9) and the stud holes (10).

39 Claims, 4 Drawing Sheets

DIFFERENTIAL FOR MOTOR VEHICLES

Figure 1:
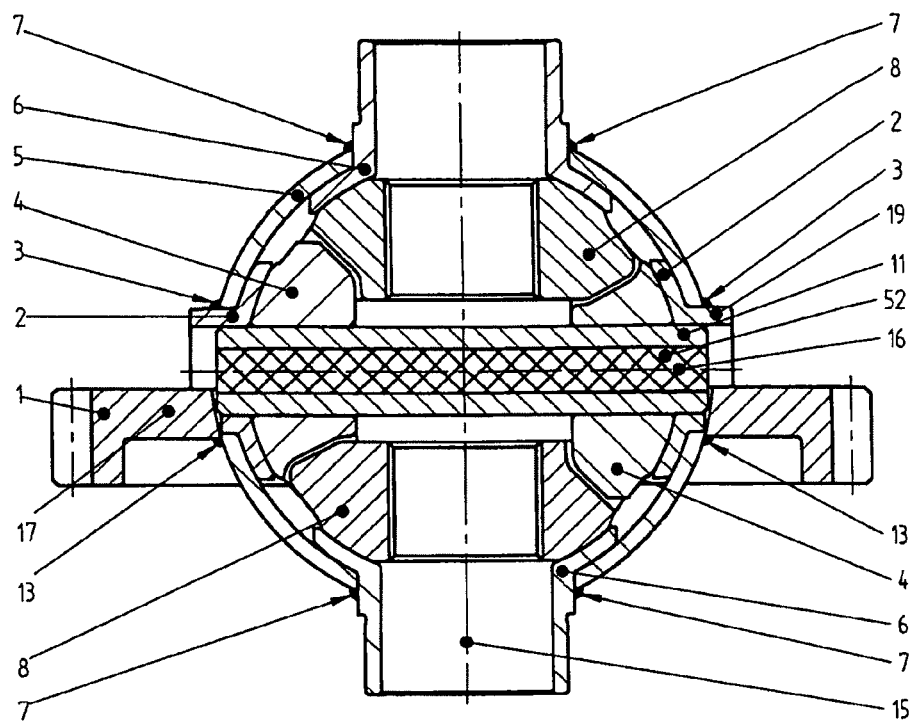

The invention relates to a differential for motor vehicles according to the preamble of claim 1.

Such a motor-vehicle differential is described in DE 4417373A1. The differential housing of that differential encloses a cage, which is made by forming a cylindrical pipe section of steel into a spherical shape. The differential housing consists of two housing halves, with which the drive gear of the differential is joined to rotate and in which the axle spindles for the differential gears are mounted. To this extent the only function of the cage is to absorb the forces exerted by the axle-shaft bevel gears in the direction of the drive shafts.

Other differentials having a differential housing and a drive gear joined to rotate therewith are known from DE 1810520 A, U.S. Pat. Nos. 4,455,889 A and 3,554,055 A.

In contrast, the object of the present invention is to provide a strength-optimized differential of the type mentioned in the introduction, wherein the differential housing is of particularly simple construction, consists of few components but nevertheless permits considerable savings in weight and installation space for low manufacturing costs.

This object is achieved according to the invention by a configuration of the differential mentioned in the introduction according to the body of claim 1.

The inventive differential is characterized by an extremely simply configured differential housing, which is advantageously made from a pipe section, for example is formed as a section of a steel pipe or from a fiber-reinforced composite material, and in which two diametrically opposite axle-shaft bores for the passage of the axle drive shafts and two diametrically opposite spindle bores for receiving the follower spindle are provided. The former are centered around the axis of rotation of the differential housing, while the axes of the latter lie in a middle plane perpendicular to the axis of rotation and between the axle-shaft bores in the manner of a standard differential construction. It is self-evident that the drive gear is joined to rotate with the outside of the differential housing, in such a way that the engine drive torque is transmitted via the drive gear to the differential housing and from this via the follower spindles and the differential bevel gears simultaneously to the axle-shaft bevel gears. Since the differential bevel gears are mounted such that they can rotate freely around the follower spindle, they are able to fulfill the function of the differential, in that they rotate with different speeds of revolution and thus ensure uniform torque transmission via the axle-shaft bevel gears to the axle drive shafts.

By virtue of the inventive reliefs at both ends of the tubular differential housing, the object of weight and material savings according to the invention is achieved by the fact that the reliefs describe cutouts of the differential housing close to the axle-shaft bores and the spindle bores. These cutouts forming the reliefs therefore correspond to the end edges of the tubular differential housing. When the reliefs of the differential housing are advantageously shaped symmetrically relative to the pipe axis, the possibility exists of cutting off a plurality of differential housings practically without pipe intersections from one pipe available as standard material, thus achieving considerable material savings.

To ensure mechanical stiffness of the differential housing, it is expedient—provided the geometry of the axle-shaft bores and the bearing face assigned to the spindle bores are not impaired thereby—for the cutouts to be respectively disposed at approximately the same distance from these bores, regardless of whether these bores have equal or different diameters. By such optimization of the profile of the cutouts at the ends of the tubular differential housing, both the economic and the technical prerequisites for the manufacture of a differential housing in conformity with the inventive object are completely met.

By virtue of their high basic strength, steel pipes of toughened or non-toughened steels represent the ideal semifinished product for manufacture of the inventive differential housing. Besides low costs for the semifinished product, savings are achieved due to small component cross sections. The weight savings achieved as a result are further improved by optimization of the profile of the reliefs as explained in the foregoing.

In addition, by choosing simple components of steel pipe, the possibility exists of manufacturing the differential housing in sandwich construction for further weight savings, for example by using an intermediate pipe of fiber-reinforced composite material.

By using steel pipes as semifinished product and suitable cutting technology such as wire erosion, the manufacture of an inventive differential housing is associated with minimum time and effort. As a supplement to the cut-to-size piece of tubular semifinished product, guide inserts, of steel alone or in combination with a suitable fiber-reinforced composite material of plastic are advantageous, which inserts are fastened in the axle-shaft bores, have guide faces for bracing the axle-shaft bevel gears and function as bearing for the differential; the same is true for such guide inserts that are fastened in the spindle bores and which have guide faces for bracing the differential bevel gears and also function as bearing for the follower spindle.

These guide inserts are joined to the tubular differential housing, for example by laser welding.

Instead of guide inserts, the possibility exists of constructing the rims of the spindle bores on the one hand and of the axle-shaft bores on the other in such a way that they form guide projections for bracing the differential bevel gears or the axle-shaft bevel gears respectively. Thereby separate guide inserts are superfluous.

In constructing the guide projections, it must be decided whether differential or axle-shaft bevel gears will be used, which depending on design are constructed either as shaft or ball gears, in other words whether their rear stop or guide faces have plane or spherical geometry. The components known as shoulder gears with cylindrical stop or guide faces are also conceivable.

According to a further embodiment of the invention, it is provided that the differential housing will have a flattened portion on its outside, produced by forming, for example, extending over its entire length on each of both sides in the region of the spindle bores.

By virtue of such a flattened portion produced by forming technology, not only can the bond of the drive gear along plane contact faces for the welded joint be simplified, but also additional cold strengthening of the material is achieved by the fact that the flattened portion is produced by forming, whereby the housing stiffness is improved.

An additional stiffening effect may also be achieved by providing the differential housing with a plurality of beads functioning as stiffeners, the number, shape and alignment of which may be as desired, but which preferably form an inwardly projecting welt.

Furthermore, the differential housing may be provided with a plurality of through holes or recesses for further weight savings.

The joint between the drive gear and the tubular differential housing may be further improved by providing the drive gear with contact faces running along generating lines on the outside of the differential housing. These contact faces are advantageously made to conform to the surface geometry of the differential housing, for example as plane faces in differential housings with flattened portions or as faces with spherical cross section corresponding to the curvature of a cylindrical differential housing.

Instead of a differential housing of cylindrical cross section, profiled tubular differential housings are also conceivable, for example with substantially square cross section and rounded edges.

Within the scope of the invention, the follower spindle may be of hollow or solid construction or may be provided with recesses. Hollow steel spindles may be optimized in terms of stiffness by injection of fiber-reinforced composite material or of plastic containing filler material. After the follower spindle has been inserted into the corresponding spindle bores or guide inserts, into which the differential bevel gears have been inserted beforehand, it may be secured in axial direction, for example by pins, or may be fixed axially by the drive gear, and possibly additionally fastened by welding.

For bearing of the differential housing, it may be expedient to fasten additional guide attachments thereto as extensions of the axle shaft holes, for example by welding. However, such guide attachments may be omitted if the guide inserts introduced into the axle-shaft bores or guide projections formed on the housing project far enough outwardly beyond the differential housing.

If necessary, additional stiffening stays running transversely relative to the end regions of the differential housing may be attached on the outside of the differential housing.

Preferably toothed gears of several variants are conceivable as the drive gear, for example such with straight or helical bond of the toothing on the gear disk. Various toothing geometries such as helical or hypoid toothings may also be used.

For further weight savings, the drive gear is designed if at all possible to have a diameter smaller than the differential housing would need at the height of the spindle bores. In this case it is mounted eccentrically on the differential housing.

If the same oil is used for the transmission and the differential, the drive gear does not have any sealing function. In this case it will be advantageously provided with as many large, axially continuous through holes as possible, in order to minimize the weight. In contrast, if it has a sealing function, it will not be provided with any through holes and must be joined sealingly with the differential housing, so that by means thereof the volumes located above the gear can be sealed off from the volumes located below the gear.

Figure 2:
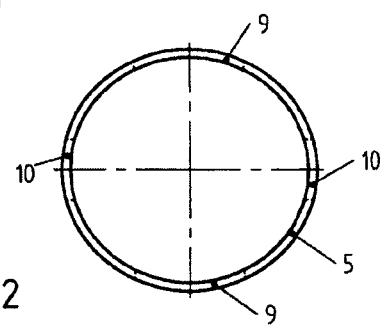
Figure 3:
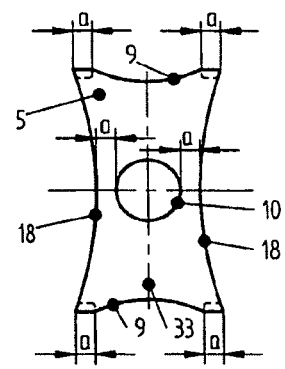
Figure 4:
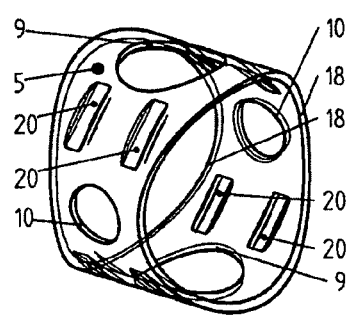
Figure 5:
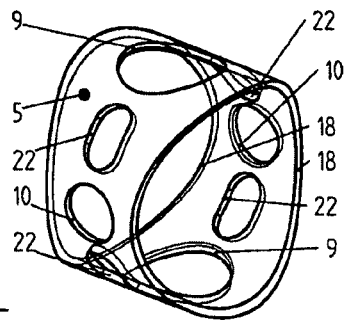
Figure 6:
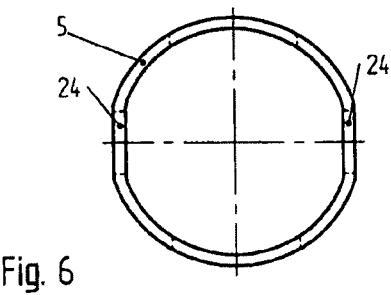
Figure 7:
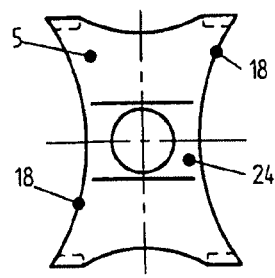
Figure 8:
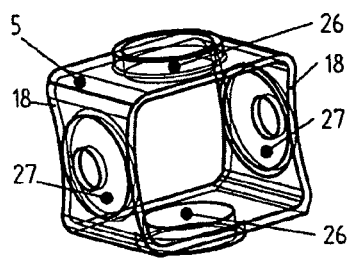
Figures 9, 10:
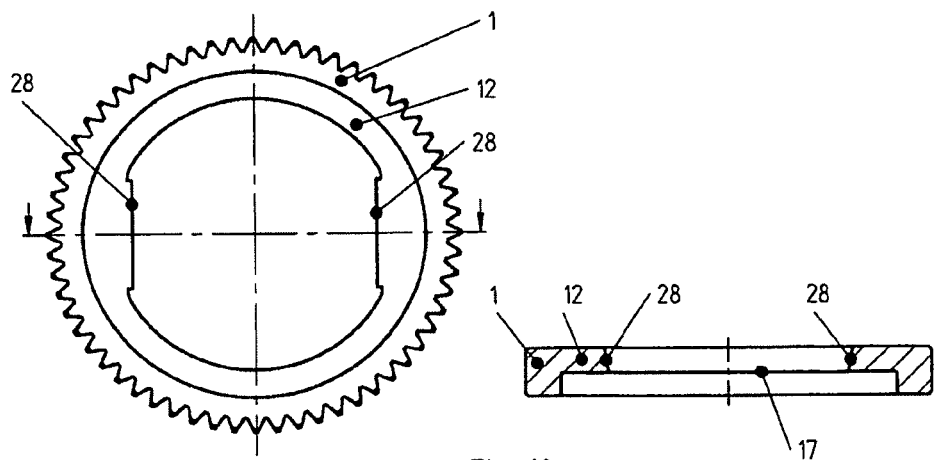
Figure 11:
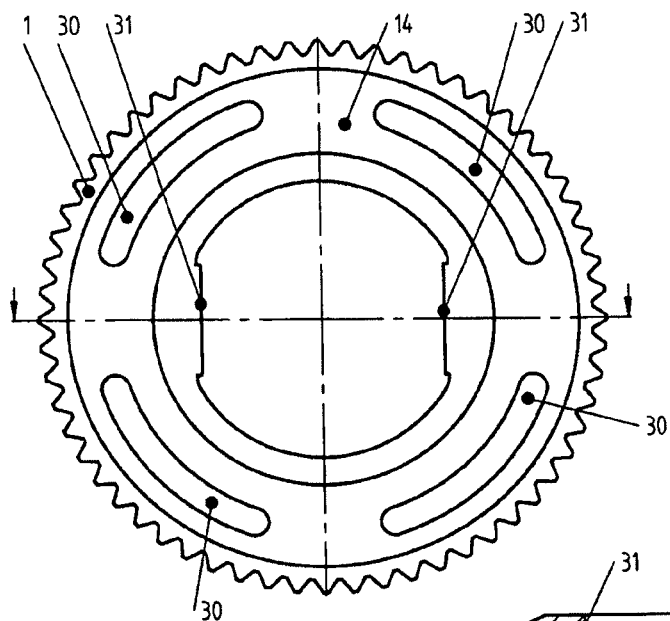
Figure 12:
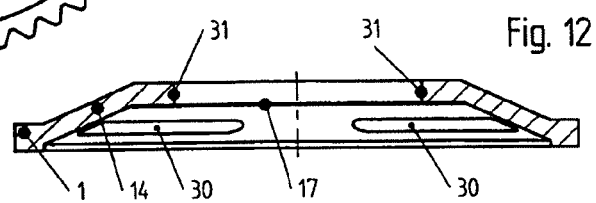
Figure 13:
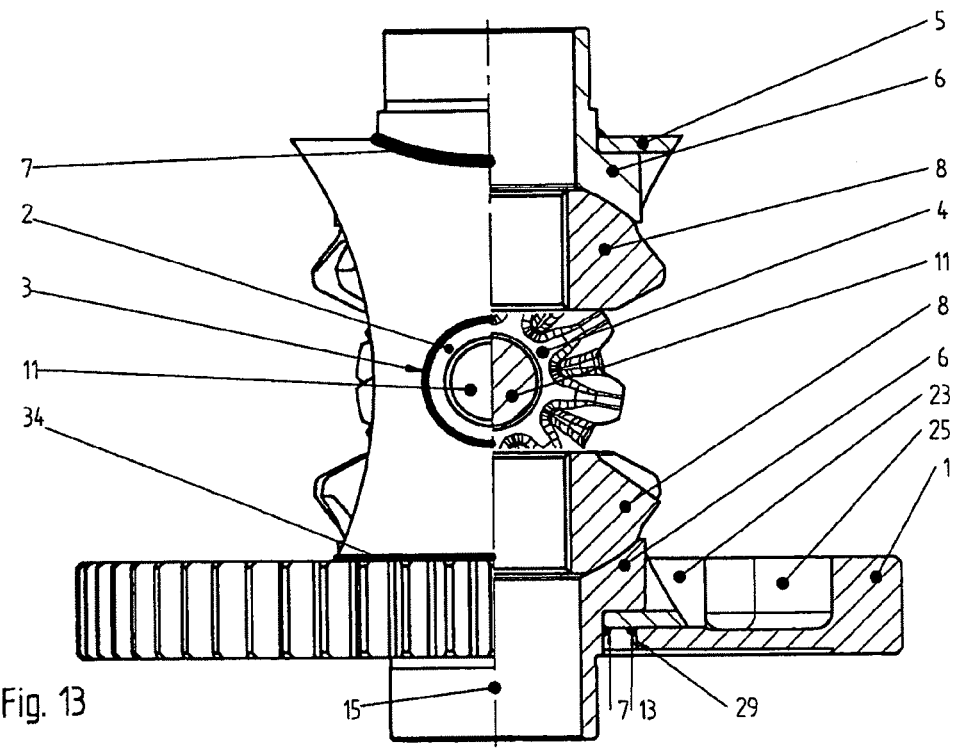
Figure 14:
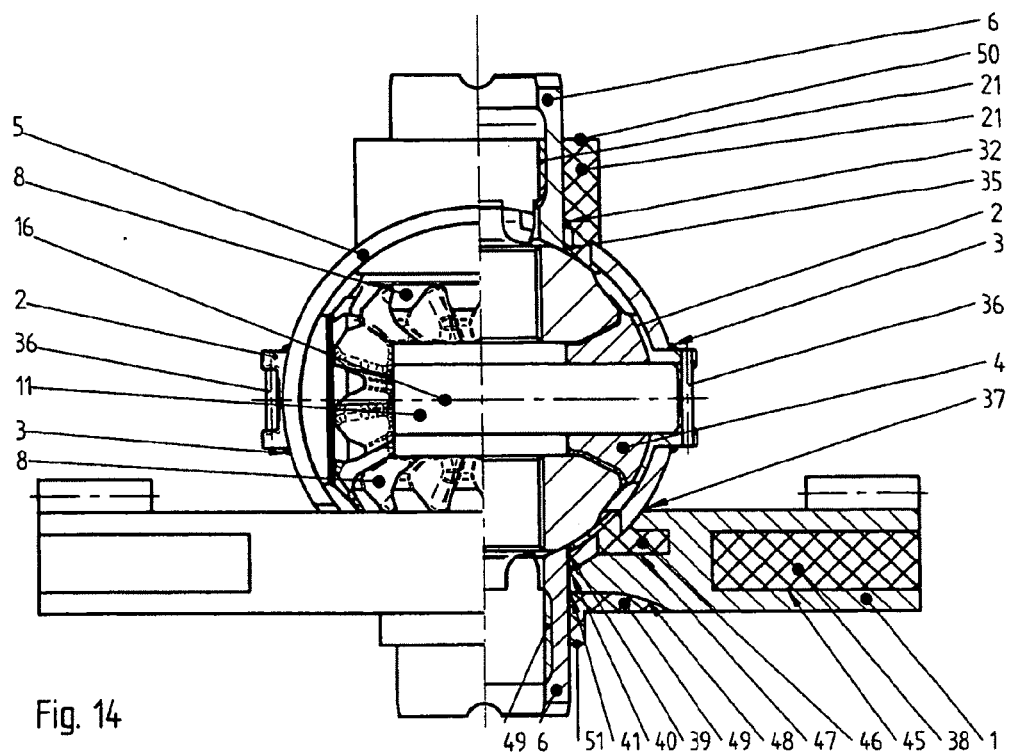
Figure 15:
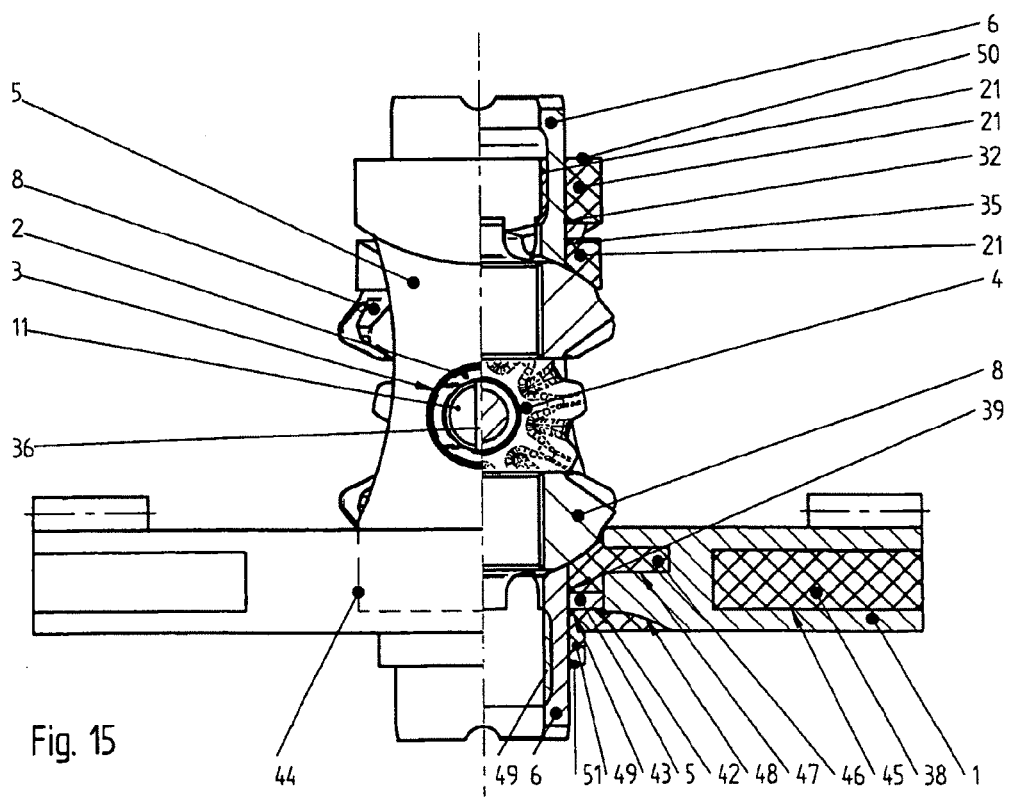

Exemplary embodiments of the invention will be explained hereinafter on the basis of the drawing, wherein FIG. 1 shows a cross section through a differential with drive gear without sealing function, FIG. 2 shows a front view of a cylindrical differential housing, FIG. 3 shows the differential housing according to FIG. 2 in side view, FIG. 4 shows a perspective view of a cylindrical differential housing with beads, FIG. 5 shows a perspective view of a cylindrical differential housing with through holes, FIG. 6 shows a front view of a substantially cylindrical differential housing with lateral flattened portions, FIG. 7 shows the differential housing according to FIG. 6 in side view, FIG. 8 shows a perspective view of a differential housing with approximately square cross section, FIG. 9 shows a drive gear as a spur gear with straight bond to the gear disk, FIG. 10 shows an axial cross section through the spur gear according to FIG. 9, FIG. 11 shows a drive gear as a spur gear with helical bond to the gear disk, FIG. 12 shows an axial cross section through the spur gear according to FIG. 11, FIG. 13 shows a partly cutaway side view of a differential with a sealing function of the drive gear, FIG. 14 shows a partly cutaway front view of a differential with stiffening matrices, and FIG. 15 shows a partly cutaway side view of the differential according to FIG. 14.

FIG. 1 shows a differential for a motor vehicle in a cross section through the axes of the differential, namely axis 15 of the drive shaft and axis 16 of follower spindle 11. The differential according to the exemplary embodiment described here comprises a cylindrical differential housing 5 of refined or non-refined steel material, in which the transmission components are mounted and on the outside of which a drive gear 1 is fastened by welding. Of the two welds on opposite sides of differential housing 5, only welds 13 on the underside of gear disk 17 of drive gear 1 constructed as a spur gear are shown; the opposite welds on the upper side of gear disk 17 are not visible in the chosen cross-sectional diagram, but run correspondingly along generating lines of differential housing 5. Collar part 19, extending from differential housing 5, of guide inserts 2 for the spindle bores is cut out in the region of drive gear 1, so that gear disk 17 thereof extends with its contact faces 28 (see FIG. 10) as far as follower spindle 11.

Differential housing 5 possesses bores for follower spindle 11 and for the axle shafts (not illustrated). Steel guide inserts are introduced into each of these bores and welded together with the outside of differential housing 5. Guide inserts 6 for the axle-shaft bores are each fastened by means of a circumferential weld 7; guide inserts 2 for the spindle bores are fastened by means of circumferential welds 3. At their insides, guide inserts 2, 6 form guide faces for bracing the associated bevel gears, namely differential bevel gears 4 or axle-shaft bevel gears 8. Differential bevel gears 4 rotate freely on follower spindle 11 and are engaged with axle-shaft bevel gears 8. The rotation of differential housing 5 is transmitted via guide inserts 2, follower spindle 11 and differential bevel gears 4 to axle-shaft bevel gears 8.

Follower spindle 11 of steel is of hollow construction in order to save weight; as its core it possesses a stiffening matrix 52 of plastic stiffened with filler.

A differential housing 5 as illustrated in FIG. 1 is also shown as a semifinished product in smaller scale in each of several variants according to FIGS. 2-8.

The embodiment according to FIGS. 2 and 3 shows a cylindrical differential housing 5 with diametrically opposite axle-shaft bores 9 and spindle bores 10. The ends of the cylindrical shape are each provided with a relief 18, which shortens their maximum length extent and the cutouts of which, according to the illustrated example, respectively run with the same distance a from axle-shaft bores 9 on the one hand and spindle bores 10 on the other hand. Thereby minimum stiffness of the differential housing is assured while taking into consideration the respective bore diameter, in which case, according to the illustrated example spindle bores 10 have a much smaller diameter compared with axle-shaft bores 9. Relief 18 therefore permits distinct material and thus also weight savings with adequate strength of differential housing 5. Relief 18 is shaped symmetrically relative to longitudinal axis 33 of differential housing 5, and so housing sections following one another on a supply pipe are identical, and it merely has to be ensured that axle-shaft bores and spindle bores are then disposed at alternating positions offset 90° apart.

FIG. 4 shows a perspective diagram of a cylindrical differential housing 5, which in contrast to FIG. 2 additionally has eight inwardly projecting beads 20, which function for additional stiffening of differential housing 5.

FIG. 5 shows another embodiment of a cylindrical differential housing 5, which in contrast to FIG. 2 has four through holes 22, which function for weight reduction.

FIG. 6 in turn shows a substantially cylindrical differential housing 5, which in contrast to FIG. 2 has lateral flattened portions 24, the extent of which is visible in the side view according to FIG. 7. The flattened portion is advantageously created by chipless reshaping of the cylindrical shape with simultaneous cold strengthening, so that flattened portions 24 function for additional stiffening of differential housing 5.

FIG. 8 shows a tubular differential housing 5 with a profiled cross section of approximately square shape with rounded corners. This cross sectional shape is particularly suitable for attaching outwardly curved guide projections 26, 27, which function as bracing for bevel gears 8 and 4 respectively. In this example, guide projections 26 are suitably shaped for bracing axle-shaft bevel gears 8 of the shaft gear type. Guide projections 27 serve an analogous purpose for bracing of differential bevel gears 4 of ball gear type.

FIGS. 9 and 10 show a face view and cross section of a drive gear 1 in the form of a spur gear with straight bond 12 to its gear disk 17. On the inside circumference of gear disk 17, spherical contact faces 28 are disposed on the respective opposite sides for the purpose of full-surface contact with the outside of a cylindrical differential housing 5.

FIGS. 11 and 12 show a drive gear 1 again in the form of a spur gear, but in this case with helical bond 14 to gear disk 17. Contact faces 31 have plane construction in this case, as is expedient for fastening to a differential housing of the type with flattened portions 24 according to FIG. 6. Four slots 30 running in circumferential direction function to reduce the weight of the spur gear.

FIG. 13 shows a variant of the differential according to FIG. 1, namely with a drive gear 1, which is joined sealingly to the underside of differential housing (5). In this way separation of the oil volumes on the two sides of drive gear 1 is achieved, so that different oils can be used, on the one hand for the transmission and on the other hand for the differential. The sealing function is achieved by a weld 34 on the upper side of drive gear 1 along the generating lines of differential housing 5 as well as by a weld 13 inside a middle bore 29 on the underside of drive gear 1. On their inner bores, axle shaft gears 8 possess the internal slip-on toothing common for transmission of torque to the drive shaft (not illustrated). Otherwise, components or elements identical to those of FIG. 1 are shown in the drawing with the same reference numerals as in FIG. 1.

FIGS. 14 and 15 show, for the example of a differential with stiffening matrixes 21, 38, 46, 49, a further variant of the differential according to FIG. 1, except that, in contrast to FIG. 1, no spur gear but instead a ring gear schematically illustrated roughly as a drive gear is used in this case. FIG. 14 shows the partly cutaway front view and FIG. 15 the partly cutaway side view of the same differential. Differential housing 5 is inserted into the inside geometry of drive gear 1, which is provided with a plurality of recesses 45, 47, 48 and is joined thereto with corresponding welds 37, 40, 42. Furthermore, guide inserts 6 of tubular construction are joined to differential housing 5 with a plurality of welds 32, 35, 39, 43 and to drive gear 1 via a further weld 41. Stiffening matrixes 21, 38, 46, 49 are created, for example, by plastic injection molding; by virtue of these, on the one hand the stiffness of the overall system is increased, while on the other hand the total weight of the system is appreciably reduced compared with a solid steel variant by virtue of the use of a material with much lower density than steel. To optimize the stiffness, differential housing 5 and guide inserts 6 are provided with through holes, which are illustrated only partly here, which are filled by stiffening matrices. Furthermore, in the illustrated variant, the bearing faces for the axle-shaft bevel gears are partly provided by two stiffening matrixes 21, 46, as are the axial stops 50, 51 for the radial bearing of the differential system by two further stiffening matrixes 21, 29. The follower spindle is axially secured by pins 36. Differential housing 5 is not constructed symmetrically relative to follower axis 16. Its outside geometry can be seen from the cutaway drawings in FIGS. 14 and 15, and its outline is indicated by dashed line 44 in FIG. 15. Components identical to those of FIG. 1 are denoted by the same reference numerals.

The invention claimed is:

1. A differential for motor vehicles, the differential comprising:
   a tubular differential housing comprising a drive gear for transmission of engine drive torque;
   a follower spindle integral with the housing;
   differential bevel gears mounted on follower spindle, the differential bevel gears meshing with axle-shaft bevel gears,
   two diametrically opposite axle-shaft bores in the housing for passage of axle drive shafts;
   two diametrically opposite spindle bores in the housing for receiving the follower spindle; and
   reliefs provided at both ends of the housing, the reliefs being cutouts of the differential housing close to the axle-shafts bores and the spindle bores;
   wherein recesses are provided in the drive gear, the recesses being filled with a plastic, a plastic comprising a filler, or a fiber-reinforced composite material to form a stiffening matrix.

2. A differential according to claim 1, wherein the cutouts forming the reliefs are shaped symmetrically relative to a pipe axis of the differential housing.

3. A differential according to claim 2, the cutouts are respectively disposed at approximately a same distance from the axle-shaft bores and the spindle bores.

4. A differential according to claim 1, further comprising first guide inserts for bracing the axle-shaft bevel gears, first guide inserts being fastened in the axle-shaft bores.

5. A differential according to claim 1, further comprising second guide inserts for bracing the differential bevel gears, the second guide inserts being fastened in the spindle bores.

6. A differential according to claim 1, wherein rims of the spindle bores form guide projections for bracing the differential bevel gears.

7. A differential according to claim 6, wherein the guide projections for bracing the differential bevel gears comprise a shoulder or shaft gears or ball gears.

8. A differential according to claim 1, wherein rims of the axle-shaft bores form guide projections for bracing the axle-shaft bevel gears.

9. A differential according to claim 8, wherein the guide projections for bracing the axle-shaft bevel gears comprise a shoulder or shaft gears or ball gears.

10. A differential according to claim 1, wherein the differential housing has a flattened portion on an outside of the housing, the flattened portion extending over an entire length of the housing proximal to the spindle bores.

11. A differential according to claim 1, wherein the differential housing comprises a plurality of beads for stiffening the housing.

12. A differential according to claim 1, wherein the differential housing comprises a plurality of through holes.

13. A differential according to claim 1, wherein the drive gear comprises contact faces on an inside circumference of the drive gear, the contact faces being a joint with the differential housing.

14. A differential for motor vehicles, the differential comprising:
   a tubular differential housing comprising a drive gear for transmission of engine drive torque;
   a follower spindle integral with the housing;
   differential bevel gears mounted on follower spindle, the differential bevel gears meshing with axle-shaft bevel gears,
   two diametrically opposite axle-shaft bores in the housing for passages of axle drive shafts;
   two diametrically opposite spindle bores in the housing for receiving the follower spindle; and
   reliefs provided at both ends of the housing, the reliefs being cutouts of the differential housing close to the axle-shaft bores and the spindle bores;
   wherein recesses are provided in the drive gear and the differential housing, the recesses being filled with a plastic, a plastic comprising a filler, or a fiber-reinforced composite material to form a stiffening matrix.

15. A differential according to claim 14, wherein the cutouts forming the reliefs are shaped symmetrically relative to a pipe axis of the differential housing.

16. A differential according to claim 15, wherein the cutouts are respectively disposed at approximately a same distance from the axle-shaft bores and the spindle bores.

17. A differential according to claim 14, further comprising first guide inserts for bracing the axle-shaft bevel gears, first guide inserts being fastened in the axle-shaft bores.

18. A differential according to claim 14, further comprising second guide inserts for bracing the differential bevel gears, the second guide inserts being fastened in the spindle bores.

19. A differential according to claim 14, wherein rims of the spindle bores form guide projections for bracing the differential bevel gears.

20. A differential according to claim 19, wherein the guide projections for bracing the differential bevel gears comprise a shoulder or shaft gears or ball gears.

21. A differential according to claim 14, wherein rims of the axle-shaft bores form guide projections for bracing the axle-shaft bevel gears.

22. A differential according to claim 21, wherein the guide projections for bracing the axle-shaft bevel gears comprise a shoulder or shaft gears or ball gears.

23. A differential according to claim 14, wherein the differential housing has a flattened portion on an outside of the housing, the flattened portion extending over an entire length of the housing proximal to the spindle bores.

24. A differential according to claim 14, wherein the differential housing comprises a plurality of beads for stiffening the housing.

25. A differential according to claim 14, wherein the differential housing comprises a plurality of through holes.

26. A differential according to claim 14, wherein the drive gear comprises contact faces on an inside circumference of the drive gear, the contact faces being a joint with the differential housing.

27. A differential for motor vehicles, the differential comprising:
   a tubular differential housing comprising a drive gear for transmission of engine drive torque;
   a follower spindle integral with the housing;
   differential bevel gears mounted on follower spindle, the differential bevel gears meshing with axle-shaft bevel gears,
   two diametrically opposite axle-shaft bores in the housing for passages of axle drive shafts;
   two diametrically opposite spindle bores in the housing for receiving the follower spindle; and
   reliefs provided at both ends of the housing, the reliefs being cutouts of the differential housing close to the axle-shaft bores and the spindle bores;
   wherein at least one guide insert is provided with through holes, the guide insert and recesses in the differential housing or in the drive gear are filled with a plastic, a plastic comprising a filler, or a fiber-reinforced composite material in order to form a common stiffening matrix.

28. A differential according to claim 27, wherein the cutouts forming the reliefs are shaped symmetrically relative to a pipe axis of the differential housing.

29. A differential according to claim 28, wherein the cutouts are respectively disposed at approximately a same distance from the axle-shaft bores and the spindle bores.

30. A differential according to claim 27, further comprising first guide inserts for bracing the axle-shaft bevel gears, first guide inserts being fastened in the axle-shaft bores.

31. A differential according to claim 27, further comprising second guide inserts for bracing the differential bevel gears, the second guide inserts being fastened in the spindle bores.

32. A differential according to claim 27, wherein rims of the spindle bores form guide projections for bracing the differential bevel gears.

33. A differential according to claim 32, wherein the guide projections for bracing the differential bevel gears comprise a shoulder or shaft gears or ball gears.

34. A differential according to claim 27, wherein rims of the axle-shaft bores form guide projections for bracing the axle-shaft bevel gears.

35. A differential according to claim 34, wherein the guide projections for bracing the axle-shaft bevel gears comprise a shoulder or shaft gears or ball gears.

36. A differential according to claim 27, wherein the differential housing has a flattened portion on an outside of the housing, the flattened portion extending over an entire length of the housing proximal to the spindle bores.

37. A differential according to claim 27, wherein the differential housing comprises a plurality of beads for stiffening the housing.

38. A differential according to claim 27, wherein the differential housing comprises a plurality of through holes.

39. A differential according to claim 27, wherein the drive gear comprises contact faces on an inside circumference of the drive gear, the contact faces being a joint with the differential housing.

* * * * *